United States Patent [19]

Takeuchi et al.

[11] Patent Number: 4,643,957
[45] Date of Patent: Feb. 17, 1987

[54] FUEL CELL

[75] Inventors: Seizi Takeuchi, Hitachiota; Tomoichi Kamo, Ibaraki; Tatsuo Horiba, Hitachi; Kunko Kitami, Hitachi; Toshikatsu Mori, Hitachi; Toshiki Kahara, Ibaraki; Jinichi Imahashi; Akio Honji, both of Hitachi; Masato Takeuchi, Katsuta; Kohki Tamura, Hitachi, all of Japan

[73] Assignee: Hitachi, Ltd., Tokyo, Japan

[21] Appl. No.: 722,157

[22] Filed: Apr. 11, 1985

[30] Foreign Application Priority Data

Apr. 11, 1984 [JP] Japan .................................. 59-70876

[51] Int. Cl.$^4$ ........................ H01M 8/04; H01M 4/86
[52] U.S. Cl. ......................................... 429/41; 429/46
[58] Field of Search ........................ 429/16, 41, 42, 46

[56] References Cited

U.S. PATENT DOCUMENTS

| 3,972,735 | 8/1976 | Breault | 136/122 |
| 4,017,663 | 4/1977 | Breault | 429/12 |
| 4,493,879 | 1/1985 | Kahara et al. | 429/41 |

Primary Examiner—Donald L. Walton
Attorney, Agent, or Firm—Antonelli, Terry & Wands

[57] ABSTRACT

In a fuel cell comprising a pair of counterposed gas-diffusible electrodes, an electrolyte-retaining, porous matrix provided between and in contact with the electrodes, a fuel chamber for feeding a gaseous fuel to the anode of the pair of the electrodes and an oxidizing agent chamber for feeding a gaseous oxidizing agent to the cathode of the pair of the electrodes, the cell performance is remarkably prevented from lowering by making the electrolyte saturated absorption amount of the cathode smaller than that of the anode, thereby preventing migration of the electrolyte in the electrolyte-retaining matrix.

20 Claims, 10 Drawing Figures

FUEL CELL

BACKGROUND OF THE INVENTION

This invention relates to a fuel cell having such a structure that a gaseous fuel and a gaseous oxidizing agent are fed to the anode and the cathode, respectively, of a pair of gas-diffusible electrodes counterposed on both sides of a liquid electrolyte, and particularly to a fuel cell using phosphoric acid as an electrolyte.

The fuel cell having such a structure that a gaseous fuel is fed to the anode of the electrodes counterposed on both sides of a liquid electrolyte and a gaseous oxidizing agent to the cathode includes, for example, a fuel cell using phosphoric acid as an electrolyte and a fuel cell using fused carbonate as an electrolyte.

It is known that the performances of these fuel cells are lowered with an increase in the operating time. To prevent the fuel cell performance from the lowering, various studies and improvements of electrodes or electrolyte-retaining matrices have been made. For example, Japanese Patent Publication No. 58-156 corresponding to U.S. Pat. No. 4,017,664 discloses an electrolyte-retaining matrix made from silicon carbide particles and a binder in the so called phosphoric acid type fuel cell using phosphoric acid as an electrolyte, where the silicon carbide particles have particle sizes of less than 25 μm, preferably 10 μm. Japanese Patent Publication No. 47-10135 corresponding to U.S. patent application Ser. No. 435,827 filed on Mar. 1, 1965 now U.S. Pat. No. 4,419,493 and Japanese Patent Application Kokai (Laid-Open) No. 51-86734 corresponding to U.S. patent application Ser. No. 533,918 filed on Dec. 18, 1974 now abandoned disclose processes for preparing an electrode for a phosphoric acid type fuel cell, with no regard to any distiction between the cathode and the anode.

On the other hand, U.S. Pat. No. 4,017,663 discloses electrodes in which the amount of polytetrofluoroethylene as a water-repellent binder in an anode is different from that in a cathode, but no disclosure is made at all of the firing temperature of electrodes and the phosphoric acid saturated absorption amounts of electrodes.

SUMMARY OF THE INVENTION

An object of the present invention is to provide a fuel cell of novel structure with no substantial decrease in cell voltage with an increase in the operating time.

The present invention provides a fuel cell which comprises a pair of counterposed gas-diffusible electrodes, an electrolyte-retaining, porous matrix provided between and in contact with the pair of the electrodes, a fuel chamber for feeding a gaseous fuel to the anode of the pair of the electrodes, and an oxiding agent chamber for feeding a gaseous oxidizing agent to the cathode of the pair of the electrodes. The cathode having an electrolyte saturated absorption amount of 1 to 6 mg/cm² and the anode having a larger electrolyte saturated absorption amount than that of the cathode.

The present invention is based on a finding that the decrease in the cell voltage of a fuel cell using phosphoric acid or fused salt as an electrolyte is caused mainly by migration of the electrolyte in the matrix from the anode side to the cathode side.

The present invention will be described in detail below, referring to the accompanying drawings.

DETAILED DESCRIPTION OF THE INVENTION

Figure 1:
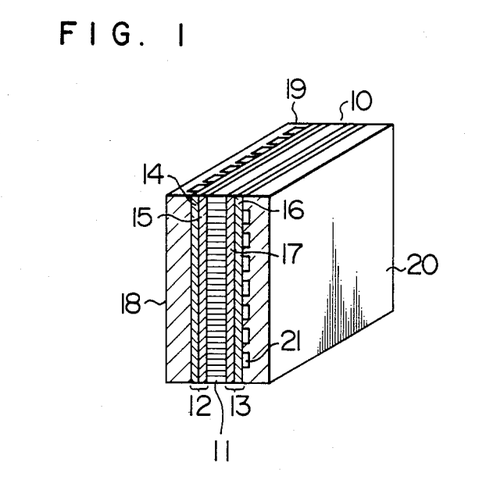
FIG. 1 is a partially cut-away, perspective view showing the structure of a typical phosphoric acid type fuel cell.

FIG. 1 is a partially cutaway perspective view of a typical phosphoric acid type fuel cell. Fuel cell 10 has a pair of counterposed gas-diffusible electrodes, i.e. cathode 12 and anode 13, and an electrolyte-retaining matrix 11 provided between the electrode. The electrolyte-retaining matrix 11 has a porous structure of electrically insulating particles or fibers such as silicon carbide particles and a binder, and phosphoric acid is retained in the voids of the matrix.

The cathode 12 is made of electroconductive porous substrate 14 and a catalyst-supporting, electroconductive, porous particle layer 16 formed at least on the electrolyte-side surface of the substrate. The anode 13 is made of an electroconductive porous substrate 16 and a catalyst-supporting, electroconductive, porous particle layer 17 formed at least on the electrolyte-side surface of the substrate.

Gas partition plate 18 is provided on the opposite side of cathode 12 to the electrolyte side, and has, on the surface in contact with the cathode, a plurality of grooves for feeding an oxygen-containing gas. Spaces called oxidizing agent chambers 19 are formed by these grooves and the cathode covering the openings of the respective grooves.

Likewise, gas partition plate 20 is provided on the opposite side of anode 13 to the electrolyte side, and has, on the anode-side surface, a plurality of grooves for feeding a hydrogen-containing gas. Spaces called fuel chambers 21 are formed by the grooves and the anode covering the openings of the respective grooves.

In the foregoing or following description, the oxygen-containing gas includes oxygen alone, and the hydrogen-containing gas includes hydrogen alone.

Figure 4:
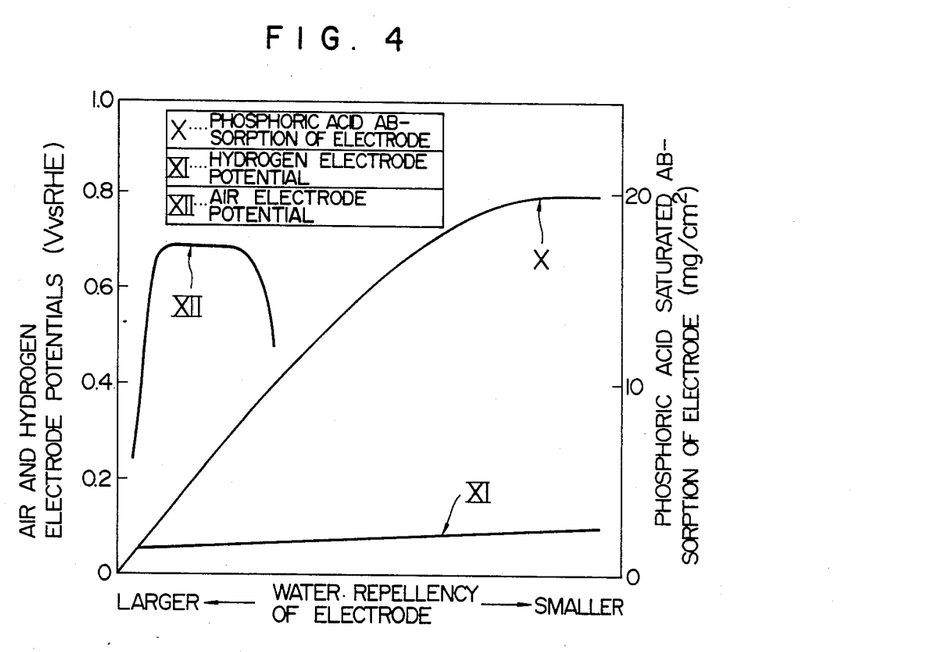
FIG. 4 is a characteristic diagram showing the relationship between the phosphoric acid saturated absorption amount of electrode and the air electrode potential or the hydrogen electrode potential.

In FIG. 4, the structure of a typical phosphoric acid type fuel cell is schematically shown. The cell voltage of the phosphoric acid type fuel cell having such a structure as above changes with operating time, for example, along curves I and II shown in FIG. 2. Curve I is plotted for a fuel cell using a gas-diffusible electrode having a larger supported catalyst content than that of another fuel cell plotted by curve II, though the cathodes and the anodes have equal composition, as will be described in detail later in Test Example 1, together with test conditions.

Figure 2:
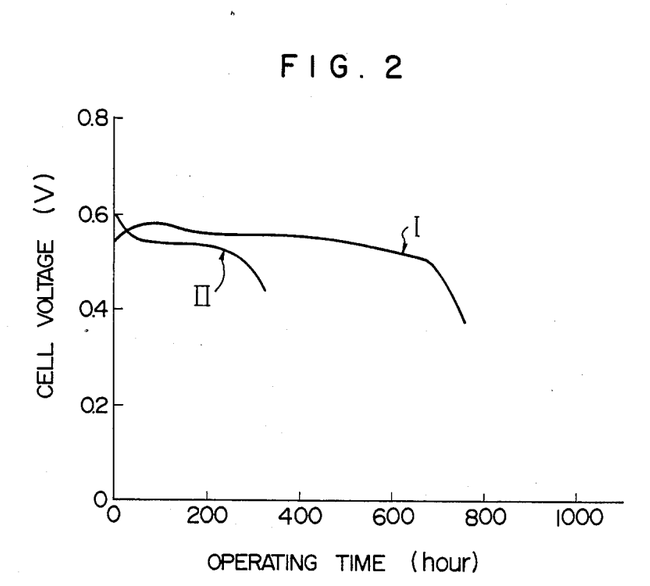
FIG. 2 is a characteristic diagram showing the relationship between the cell voltage and the operating time.

According to curve I, the cell voltage suddenly drops about 700 hours after the start of operation. According to curve II, the cell voltage likewises suddenly drops about 300 hours after the start of operation. It has been found by the present inventors that the decrease in the cell voltage about 700 hours after the start of operation at curve I and about 300 hours after the start of operation at curve II is caused by migration of phosphoric acid in the matrix from the anode side to the cathode side. As a result of the migration of phosphoric acid in the matrix from the anode side to the cathode side and the resulting permeation of a larger amount of phosphoric acid into the cathode, the amount of phosphoric acid in the phosphoric acid-retaining matrix becomes short, and thus the electric resistance becomes larger. At the same time, the cathode is too much wetted with phosphoric acid, whereas the anode is less wetted with phosphoric acid. Consequently, three-phase boundary surface area between catalyst particles as solid phase, phosphoric acid as liquid phase and gaseous fuel or gaseous oxidizing agent as a gas phase are decreased, and the electrochemical reaction fails to proceed easily. Furthermore, the pores in the cathode are filled up with the permeated phosphoric acid, and thus the gaseous oxidizing agent fails to pass through the cathode easily. Accordingly, the cell voltage drops.

The migration of phosphoric acid in the electrolyte-retaining matrix from the anode side to the cathode side gradually proceeds right after the start of operation, and it is about 700 hours after the start of operation in the case of curve I and about 300 hours in the case of curve II that its influence becomes quite remarkable.

To prevent the cell voltage from decrease with operating time, it is necessary to interrupt the migration of phosphoric acid in the matrix from the anode side to the cathode side. The present inventors have found it effective to make a difference in the phorphoric acid saturated absorption amounts between the anode and the cathode, so that the phosphoric acid saturated absorption amount of the cathode is made smaller than that of the anode to prevent phosphoric acid from the permeation into the cathode.

Migration of an electrolyte in a matrix from the anode side to the cathode side takes place likewise in the so called fused carbonate type fuel cell using a fused carbonate as an electrolyte, and thus the invention is also applicable to a fused carbonate type fuel cell.

It is desirable that an electrolyte saturated absorption amount of an anode is 3.0 to 20.0 times as large as that of a cathode. There is a great difference in the cell performance between the electrolyte saturated absorption amount of the anode of less than 3.0 times and that of 3.0 times or more than the electrolyte saturated absorption amount of the cathode.

In the phosphoric acid type fuel cell, the phosphoric acid saturated absorption amount of the cathode is preferably 1 to 6 mg/cm$^2$, more preferably 3 to 6 mg/cm$^2$, whereas that of the anode is preferably 20 mg/cm$^2$ or less.

Most preferable relationship between the phosphoric acid saturated absorption amount of the anode and that of the cathode in a phosphoric acid type fuel cell is such that the phosphoric acid saturated absorption amount of the cathode is 3 to 6 mg/cm$^2$, whereas that of the anode is 20 mg/cm$^2$ or less and 6.7 times or less than that of the cathode.

As a fuel cell having gas-diffusible electrodes is operating the liquid electrolyte continuously permeates into the gas-diffusible electrodes up to saturation, and then no more permeation into the electrodes takes place. The amount of electrolyte absorption in this state of no more permeation is called an electrolyte saturated absorption amount.

Figure 3:
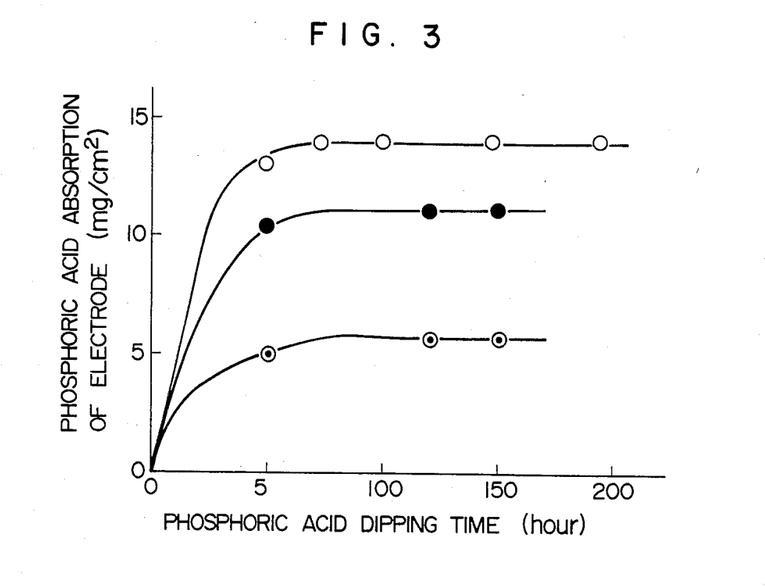
FIG. 3 is a characteristic diagram showing the relationship between the phosphoric acid abosrption amount of an electrode and the dipping time in a phosphoric acid absorption test.

In the present invention a phosphoric acid saturated absorption amount is determined according to the following procedure. An electrode is placed on carbon cloth so that the catalyst-supporting, electroconductive porous particle layer of the electrode may be at the down side and the electroconductive porous substrate thereof may be at the up side, and a gas partition plate is placed onto the electrode, and pressed downwards under a load of a few tens grams/cm$^2$. Then, the carbon cloth in that state is heated at 205° C. in a nitrogen gas atmosphere and dipped in phosphoric acid. The phosphoric acid is permeated into the electrode through the carbon cloth. Relationship between the phosphoric acid absorption into the electrode and the dipping time in the phosphoric acid is as shown in FIG. 3, where no more permeation into the electrode takes place 100 hours after the start of dipping. Thus, the phosphoric acid absorption amount of the electrode 100 hours after the start of dipping in phosphoric acid is defined as a phosphoric acid saturated absorption amount in the present invention. In FIG. 3 are shown characteristics of electrodes prepared by coating carbon paper with platinum black-supporting acetylene black as carbon particles by means of polytetrafluoroethylene as a binder and firing the coated carbon paper, where white dots represent the catalyst layer containing 60% by weight of polytetrafluoroethylene on the basis of the total of the carbon particles and polytetrafluoroethylene, black dots represent that containing 45% by weight of polytetrafluoroethylene, and double dots represent that containing 60% by weight of polytetrafluoroethylene. Firing temperature is 320° C. for the white dots, and 340° C. for the other dots.

It is seen from FIG. 3 that the phosphoric acid saturated absorption amount of a gas-diffusible electrode in a phosphoric acid type fuel cell depends on the firing temperature of the electrode and the content of water-repellent component contained in the electrode. Thus, it is possible to provide a desired phosphoric acid saturated absorption amount by properly adjusting these factors. The amount of water-repellent binder in the anode is 40 to 55% by weight, preferably 45 to 55%, on the basis of the total of the carbon particles and the water-repellent binder.

The single electrode performance changes, as phosphoric acid as the electrolyte permeates into an air electrode and a hydrogen electrode. To determine this change, both air and hydrogen electrodes are prepared by coating the surface of carbon paper with a kneaded mixture of an electrode catalyst of platinum black-supporting acetylene black and polytetrafluoroethylene and firing the coated carbon paper at 300° to 370° C. in air, where the amount of polytetrafluoroethylene is changed from 30 to 60% by weight on the basis of the total of the carbon particles and the polytetrafluoroethylene, while the amount of supported platinum black is made constant at 0.5 mg/cm$^2$.

For the air and hydrogen electrodes, phosphoric acid saturated absorption amounts are determined 100 hours after the start of dipping in phosphoric acid, and the electrodes are set in air and hydrogen single electrode test devices to determine current-potential characteristics. Air electrode potential and hydrogen electrode potentials at the current density of 220 mA/cm$^2$ are plotted in FIG. 4, where curve X shows a phosphoric acid saturated absorption amount of the electrode, curve XI shows a hydrogen electrode potential at the current density of 220 mg/cm$^2$, and curve XII shows an air electrode potential at the same current density as above.

As apparent from FIG. 4, the hydrogen electrode potential shown by curve XI has no substantial influence of polarization in a phosphoric acid saturated absorption amount range from 1 to 20 mg/cm$^2$, whereas the air electrode potential shown by curve XII has an influence of polarization in the range from 3 to 6 mg/cm$^2$ and has a maximum potential in that range. That is, the potential suddenly drops outside that range.

To prepare a cathode or an anode, a catalyst component can be supported on an electroconductive, porous particle surface usually by impregnation or precipitation to prepare catalyst-supporting, electroconductive porous particles. Then, the catalyst-supporting, electroconductive porous particles are mixed with a binder, and the resulting catalyst mixture is applied to the surface of an electroconductive, porous substrate such as carbon paper by coating, etc. Then, the coated substrate is fired.

Generally, a water-repellent binder is used as the binder, and includes, for example, polytetrafluoroethylene.

When it is desired to further increase the water-repellency of the electrode, water-repellent, non-binding particles can be added to the catalyst layer mixture, and can include, for example, graphite fluoride particles. It is possible to adjust the phosphoric acid saturated absorption amount of cathode or anode by changing at least one of the kind or amount of the water-repellent binder or water-repellent, non-binding material.

A preferable amount of the water-repellent binder in the catalyst layer of the anode is 0.81 to 1.2 times that of the cathode.

In the catalyst-supporting, electroconductive, porous particles, it is desirable that the electroconductive porous particles are carbon particles selected from acetylene black, furnace black, graphite particles, etc., and that the catalyst component is selected from noble metal particles of Periodic Table, Group VIII such as platinum, palladium, rhodium, ruthenium, iridium, etc.

The phosphoric acid saturated absorption amount of an anode or a cathode depends also on the firing temperature, and can be decreased by elevating the firing temperature. When the phosphoric acid saturated absorption amount is adjusted not by the kind or amount of a water-repellent binder or a water-repellent, non-binding material, but by the firing temperature, it is desirable that the cathode firing temperature is 340° C., or higher, preferably above the sintering temperature of the binder or the non-binding material, but below the thermal decomposition temperature of the binder or the non-binding material, whereas it is desirable that the anode firing temperature is in a range of 300° to 340° C. Thermal decomposition of polytetrafluoroethylene occurs at a temperature of about 400° C. or higher.

In the present invention, the structure of an electrolyte-retaining matrix, an oxidizing agent chamber, a fuel chamber and a gas partition plate are not particularly restricted and can be varied as desired. However, it is preferable that only the phosphoric acid-retaining matrix for a phosphoric acid type fuel cell is made particularly of silicon carbide and a metal phosphate. When a phosphoric acid-retaining matrix is made by binding silicon carbide particles to one another by means of a fluorocarbon polymer such as polytetrafluoroethylene, migration of phosphoric acid in the matrix from the anode side to the cathode side may be made more difficult to occur by making the particle size of silicon carbide particles much finer, thereby increasing the capillary attraction to the phosphoric acid. To this end, it is necessary to use much finer silicon carbide particles having particle sizes of 0.5 to 3 μm. Such much finer particles can be produced only in a very low yield, and thus use of such much finer particles is not practical.

On the other hand, when the phosphoric acid-retaining matrix is made of silicon carbide and a metal phosphate, the migration of phosphoric acid in the matrix can be considerably suppressed by using silicon carbide particles having an average particle sizes in a range of 0.1 to 100 μm without using much finer silicon carbide particles. That is, the decrease in cell voltage with the operating time can be much prevented thereby together with the adjustment of the electrolyte saturated absorption amounts of the cathode and the anode.

The metal phosphate acts as a binder and a phosphoric acid retainer. The metal phosphate for use in the present invention includes phosphates of various metals such as zirconium, titanium, etc. Zirconium phosphate is most preferable. A ratio of silicon carbide to metal phosphate by weight is 20–80:80–20.

PREFERRED EMBODIMENTS OF THE INVENTION

The present invention will be described in detail below, referring to Examples and Test Examples, to which the present invention will not be restricted.

TEST EXAMPLE 1

Relationship between the cell voltage and the operating time in a phosphoric acid type fuel cell having an anode and a cathode of equal composition was investigated. This Test Example refers to those already shown in FIG. 2.

All the electrodes corresponding to curves I and II, that is, all the cathodes and anodes, were prepared by adding 50% by weight of polytetrafluoroethylene as a binder to platinum black-supporting acetylene black on the basis of the total of the acetylene black and the binder, coating the surface of carbon paper as an electroconductive porous substrate with the resulting mixture of the acetylene black and the binder by brushing, and firing the coated carbon paper by heating at 320° C. in air for 0.5 hours. The supported platinum black amount was 0.5 mg/cm² for the catalyst shown by curve I and 0.25 mg/cm² for that by curve II.

Two unit cells of different catalyst amounts were built up from a conbination of these electrodes and phosphoric acid-retaining matrices made of silicon carbide particles and polytetrafluoroethylene, which retained 50% by weight of phosphoric acid on the basis of the matrix. The available surface area of the anode and the cathode, that is, the contact area with the electrolyte, was 100 cm².

The thus built-up two unit cells were placed in separate thermostats at 205° C., and subjected to continuous operation at the current density of 220 mA/cm² by supplying 100% hydrogen as a gaseous fuel and air as a gaseous oxidizing agent. Relationship between the cell voltage and the operating time is as shown in FIG. 2. According to curve I, the cell voltage suddenly drops about 700 hours after the start of operation, whereas according to curve II, the cell voltage suddenly drops about 300 hours after the start of operation.

The inventors made further detailed study of curve I.

In the case of curve I, the phosphoric acid amount in the electrodes after the end of operation was 3 mg/cm² for the anode and 7 mg/cm² for the cathode, whereas the phosphoric acid amount in the matrix was reduced from the initial 50% by weight to about 30% by weight. When the anode and the cathode were dismantled from the matrix, it was found that the electrolyte amount was abnormally small at the anode side in the matrix. As to the sintering, that is, agglomeration of platinum black particles, it was found by X-ray diffraction of the dismantled anode and cathode that the initial particle size 60 Å of the platinum black particles was increased to about 100 Å after the continuous operation for 700 hours.

The anode and cathode after the continuous operation for 700 hours were washed with water, dried, fired and subjected to determination of single electrode potential. It was found that the single electrode potentials were only by about 20 mV lower than the initial potentials.

It is presumable from the foregoing that the sudden drop of the cell performance after the operation for a long time is due to migration of phosphoric acid in the matrix from the anode side to the cathode side, and the resulting increase in contact resistance between the anode and the matrix, or too wettness of the cathode by the electrolyte.

To prove this presumption, further test was conducted by changing the phosphoric acid amount in the matrix to determine changes in the resistance. The results are shown in FIG. 5.

Figure 5:
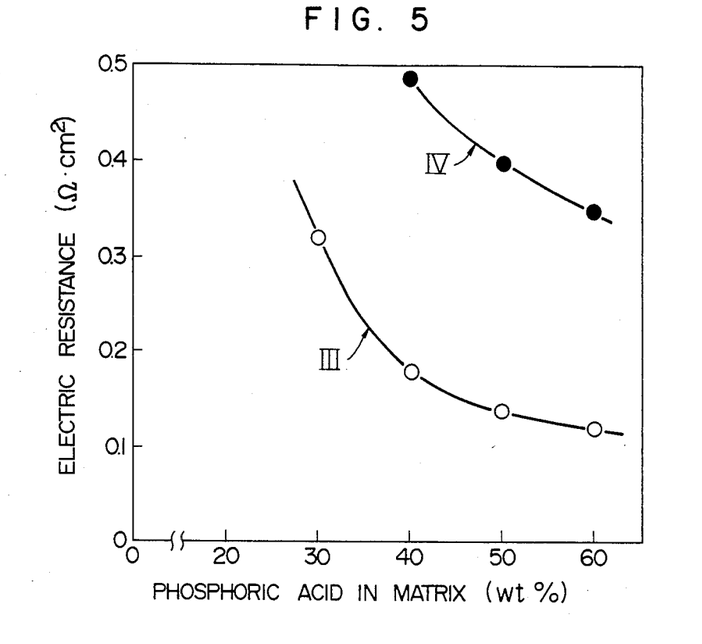
FIG. 5 is a characteristic diagram showing the relationship between the phosphoric acid amount in matrix and the electric resistance in a unit cell.

In FIG. 5, curve III shows changes in terminal electric resistance measured by sandwiching a matrix retaining a predetermined amount of phosphoric acid ($H_3PO_4$) between two platinum black-electrodeposited platinum plates, pressing the resulting assembly from both sides of the platinum plates under a load of 6 kg/cm², and heating the pressed assembly at 205° C. Since phosphoric acid fails to permeate into the platinum plates, curve III shows that the electric resistance is 0.32 Ω·cm² even in the phosphoric acid amount of 30% by weight on the basis of the matrix, and its voltage drop at the current density of 200 mA/cm² is only about 40 mV, as compared with the matrices having phosphoric acid contents of 50 to 60% by weight.

Curve IV in FIG. 5 shows changes in terminal electric resistance measured in the same manner as above, except that the same anode and cathode as in curve I of FIG. 2 were used in place of the platinum black-electrodeposited plate. The internal resistance of the electrode increases with increasing amount of polytetrafluoroethylene. Difference in the electric resistance between curves III and IV is on the following grounds. In the case of curve IV, phosphoric acid in the matrix mechanically permeates into the anode and the cathode by pressing under the load of 6 kg/cm². As a result, the phosphoric acid content in the matrix changes from the initial amount and stays reduced at the measurement of electric resistance. On the other hand, these is no change in the phosphoric acid content in the case of curve III.

Under the conditions that the phosphoric acid content is reduced in the matrix, the cell resistance becomes abnormally larger, and the cell performance is lowered.

TEST EXAMPLE 2

Changes in the phosphoric acid absorption amount of electrode when a potential was applied to the electrode were investigated.

In this Test Example, the same cathode as used in curve I of FIG. 2 was set in the single electrode test device at 190° C. and predetermined potentials were applied thereto. The potentials were against the reversible hydrogen electrode (RHE). The electrode was left standing in that state for 2 hours, and then taken out of the device to determine the phosphoric acid absorption amount. The results are shown in FIG. 6, where curve V plots the phosphoric acid absorption amount without passing the electric current at the predetermined potentials, curve VI plots those with passing the electric current at the predetermined potentials, and curve VII plots those of the same cathode as above except that the cathode was fired at a higher firing temperature of 370° C. without passing the electric current at the predetermined potentials.

Figure 6:
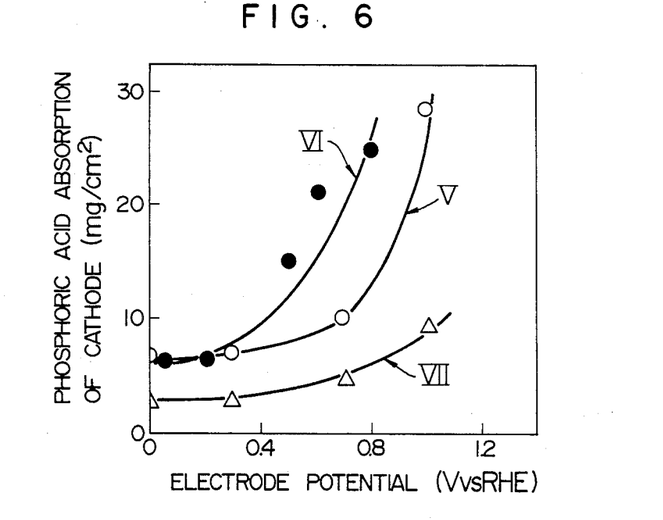
FIG. 6 is a characteristic diagram showing the relationship between the phosphoric acid absorption amount of cathode and the electrode potential.

As is obvious from curve V in FIG. 6, the phosphoric acid absorption amount of the electrode is suddenly increased at a potential of about 0.7 V when no electric current is passed, whereas the phosphoric acid absorption amount is suddenly increased at about 0.3 V when the electric current is passed.

With the water repellency-intensified electrode by elevating the firing temperature of the electrode, the migration of phosphoric acid to the electrode is less, and no sudden increase is observed even at 0.8 V.

Migration process of phosphoric acid in the matrix in the actual cell will be analyzed below on the basis of these test results.

A unit cell is built up by providing an electrolyte-retaining matrix between an anode and a cathode and fastening these members by means of cell frames. Phosphoric acid in the matrix migrates into the anode and the cathode by mechanical permeation. The unit cell is heated in this state to 205° C., i.e. cell-operating temperature, and a gaseous fuel and air are fed to the unit cell to start power generation. The potential gradient in the cell is highest at the cathode and the lowest at the anode. Thus, the phosphoric acid mechanically permeated into the anode and the phosphoric acid in the matrix migrate to the cathode side.

The phosphoric acid in the matrix undergoes said migration process, and thus in the unit cell after the continuous prolonged operation, too wettness of the cathode by phosphoric acid and phosphoric acid shortage at the anode take place, resulting in increase in the contact resistance between the anode and the matrix. Thus, it seems that the cell performance is lowered thereby. It is seen from the foregoing test results that the cell life can be prolonged by making the cathode less phosphoric acid-absorbable against the electrochemical wetting and mechanical permeation while making the anode more phosphoric acid-absorbable by mechanical permeation.

EXAMPLE 1

In this Example, the water repellency of the electrodes was adjusted by changing the amount of polytetrafluoroethylene in the electrodes, and the firing temperature and firing time of the electrodes.

Figure 7:
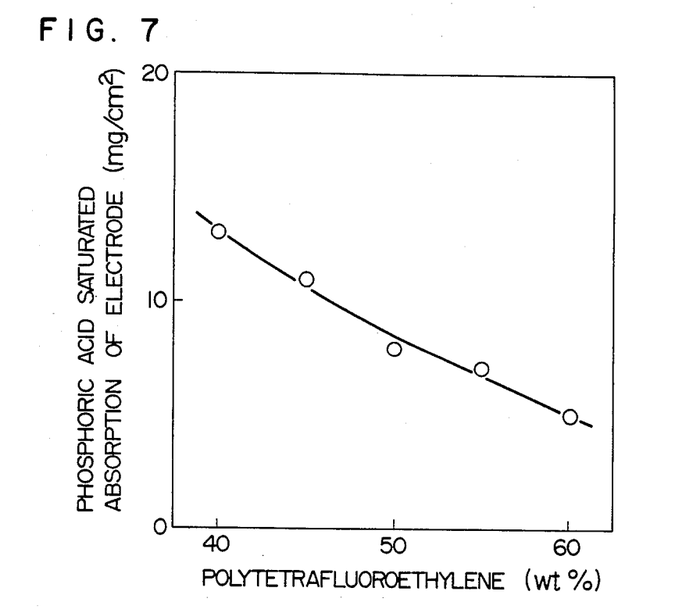
FIG. 7 is a characteristic diagram showing the relationship between the amount of polytetrafluoroethylene in the catalyst-supporting, electroconductive, porous particles and the phosphoric acid saturated absorption amount of electrode.

FIG. 7 shows the phosphoric acid saturated absorption amounts of electrodes when the amount of polytetrafluoroethylene in the catalyst-supporting, electroconductive, porous particle layer was changed. The electrodes were prepared in the following manner.

40 to 60% by weight of polytetrafluoroethylene was added to platinum black-supporting acetylene black particle on the basis of the total of the acetylene black and polytetrafluroethylene, followed by kneading. Then, the surface of carbon paper was coated with the resulting kneaded mixture, and the coated carbon paper was dried in air and fired in air by heating at 325° C. for 30 minutes.

The resulting electrodes were subjected to phosphoric acid permeation according to said test procedure for determining a phosphoric acid saturated absorption amount. Results of measuring the amounts of phosphoric acid permeated into the electrodes 100 hours after the start of permeation are shown in FIG. 7. As is obvious from FIG. 7, the phosphoric acid saturated absorption amount decreases with increasing amount of polytetrafluoroethylene in the catalyst layer.

Phosphoric acid absoration tests was carried out with the electrodes having a catalyst layer containing 40% by weight of polytetrafluoroethylene on the basis of the acetylene black and the polytetrafluoroethylene, where the firing temperature of the electrodes were changed in a range of 320° to 420° C. The firing of all the electrodes was carried out in air up to 370° C., and in a nitrogen gas at 400° C. and 420° C., while the firing time was 30 minutes in all the cases.

Figure 8:
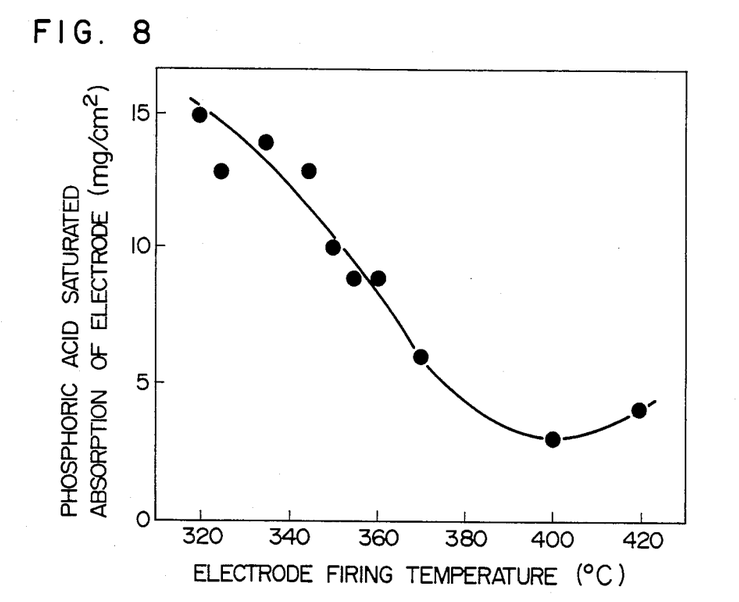
FIG. 8 is a characteristic diagram showing the relationship between the electrode firing temperature and the phosphoric acid saturated absorption amount of electrode.

The phosphoric acid saturated absorption amounts of the electrodes 100 hours after the start of permeation are shown in FIG. 8. The phosphoric acid saturated absorption amount decreases with increasing firing temperature. Particularly above about 345° C., which is the sintering temperature of polytetrafluoroethylene, the phosphoric acid saturated absorption amount is considerably reduced. That is, the water repellency of the electrode is considerably intensified.

Figure 9:
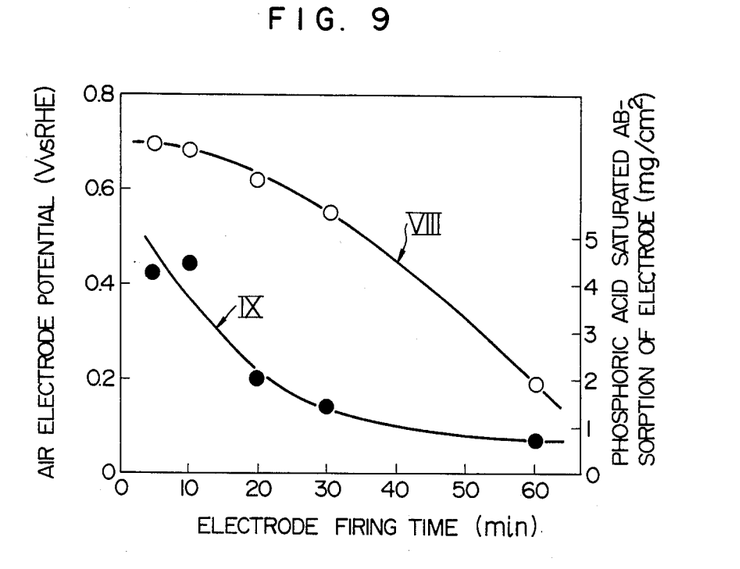
FIG. 9 is a characteristic diagram showing the relationship between the air electrode potential, the phosphoric acid saturated absorption amount of electrode, and the firing time.

Tests were carried out by changing the firing time of electrodes. The results are shown in FIG. 9.

Electrodes used for the tests in FIG. 9 were prepared in the following manner. 50% by weight of polytetrafluoroethylene was added to platinum black-supporting acetylene black particles on the basis of the total of the acetylene black and the polytetrafluoroethylene, followed by kneading. Then, the surface of carbon paper was coated with the resulting kneaded mixture, and the coated carbon paper was dried in air and fired in air at the constant firing temperature of 350° C., while changing the firing time. The amount of supported platinum black was 0.5 mg/cm$^2$ in all the cases.

The resluts shown in FIG. 9 were obtained in the following manner. The electrodes were set in separate single electrode devices at 190° C., and air electrode potentials were measured for the individual electrodes as prepared without phosphoric acid absorption at the current density of 220 mA/cm$^2$. Then, the electrodes were subjected to said phosphoric acid permeation to determine phosphoric acid saturated absorption amount in the electrodes in the same manner as above.

Curve VIII shows the air electrode potential and curve IX shows the phosphoric acid saturated absorption amount of the electrode. As is obvious from FIG. 9, the shorter the firing time, the higher the air electrode potential and the larger the phosphoric acid saturated absorption amount. On the other hand, the longer the firing time, the lower the air electrode potential and the smaller the phosphoric acid saturated absorption amount. Electrodes prepared for a longer firing time can have an air electrode potential of even about 0.7 V vs RHE by selecting conditions thoroughly adapted to the electrolyte.

It is seen from the foregoing results that the water repellency of the electrode can be adjusted by changing the amount of polytetrafluoroethylene in the catalyst-supporting, electroconductive, porous particles, and the firing temperature and firing time of the electrode. Thus, cell performance tests were carried out by changing the phosphoric acid saturated absorption amounts of the anode and the cathode.

The anode used in the cell performance tests was prepared by supporting platinum black on acetylene black particles, adding 40% by weight of polytetrafluoroethylene thereto on the basis of the total of the acetylene black and the polytetrafluoroethylene, coating the surface of carbon paper with the resulting mixture, and firing the coated carbon paper by heating at 320° C. in air for 30 minutes. The amount of supported platinum black was 0.25 mg/cm$^2$.

The cathode was prepared by supporting platinum black on acetylene black particles, adding 50% by weight of polytetrafluoroethylene thereto, and coating the surface of carbon paper with the resulting mixture and firing the coated carbon paper by heating at 370° C. in air for 30 minutes. The amount of supported platinum back was 0.5 mg/cm$^2$.

A unit cell was built up from a combination of the thus prepared electrodes and a phosphoric acid-retaining matrix containing 50% by weight of phoshoric acid on the basis of the matrix. The phosphoric acid-retaining matrix was made of silicon carbide and polytetrafluoroethylene as a binder. The available area of the electrodes was 100 cm$^2$. The unit cell was set in a thermostat at 205° C., and operated continuously at the current density of 220 mA/cm$^2$ while supplying 100% hydrogen gas as a gaseous fuel to the anode and air as a gaseous oxidizing agent to the cathode. The results are shown in FIG. 10.

Figure 10:
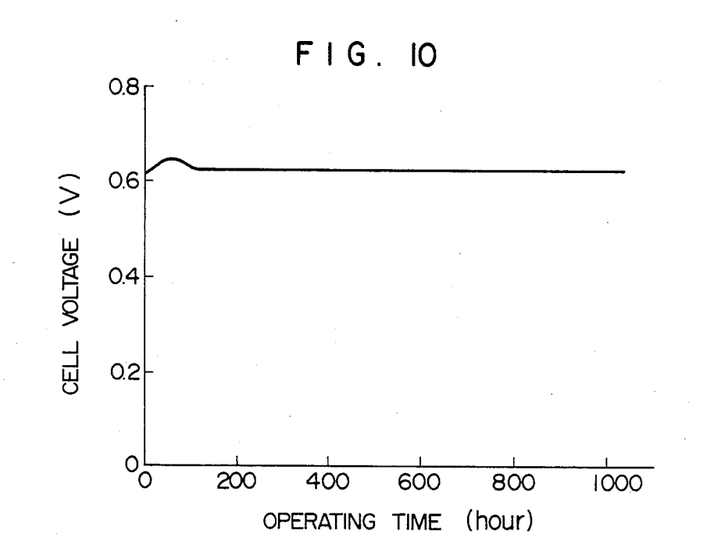
FIG. 10 is a characteristic diagram showing the relationship between the cell voltage and the operating time in a unit cell according to one embodiment of the present invention.

As is obvious from FIG. 10, in the unit cell having the anode and the cathode prepared under the conditions of the present invention, the cell voltage drop even 1,000 hours after the start of operation is about 10 m V, and the cell performance could be considerably improved.

EXAMPLE 2

In this Example, life tests was carried out by changing the kind of electroconductive, porous particles for supporting the catalyst.

The anode for use in this Example was prepared by supporting platinum black on furnance black particles (made by Cabot Corp., U.S.A.), adding 50% by weight of polytetrafluoroethylene thereto on the basis of the total of the funance black and the polytetrafluoroethylene, coating the surface of carbon paper with the resulting mixture, and firing the coated carbon paper by heating at 370° C. in air for 30 minutes. The amount of supported platinum black was 0.25 mg/cm$^2$. The cathode for use in this Example was the same as used in the cell performance tests of Example 1.

A unit cell was built up from a combination of these electrodes and a matrix retaining 50% by weight of phosphoric acid on the basis of the matrix. The available area of the electrodes was 100 cm$^2$. The unit cell was set in a thermostat at 205° C., and operated continuously at the current density of 220 mA/cm$^2$ while feeding 100% hydrogen gas to the anode and air to the cathode. As a result of continuous operation for 1,000 hours, the cell voltage drop was about 15 mV.

EXAMPLE 3

In this Example, an anode readily wettable with phosphoric acid prepared by impregnation with a metal salt and successive deposition of a metal on the electrode was used.

The same cathode as used in the cell performance tests of Example 1 was used as a cathode. The anode was prepared by impregnating the cathode as used in the cell performance tests of Example 1 with an iridium chloride solution in ethanol to obtain an impregnation of 1 mg Ir/cm$^2$, drying the impregnated cathode in air and subjecting the cathode to reduction by hydrogen. A unit cell was built up from a combination of these electrodes and a matrix retaining 50% by weight of phosphoric acid on the basis of the matrix. The available area of the electrodes was 100 cm$^2$. Then, the unit cell was set in a thermostat at 205° C., and operated continuously at the current density of 220 mA/cm$^2$ while feeding 100% hydrogen gas as a gaseous fuel to the anode and air as a gaseous oxidizing agent to the cathode. As a result of the continuous operation for 1,000 hours, the cell voltage drop was about 10 mA.

EXAMPLE 4

Life test was conducted with a unit cell having the same structure built up under the same conditions as in the cell performance tests of Example 1 except that the electrolyte-retaining matrix made of silicon carbide particles and zirconium phosphate was used, where the silicon carbide particles were a mixture of those having particle sizes of less than 100 μm and the amount of zirconium phosphate is 50% by weight on the basis of the total of the silicon carbide particles and the zirconium phosphate.

The cell voltage 400 hours after the start of operation was 0.63 V at the current density of 220 mA/cm$^2$ without any decrease in the cell performance.

As described above, the migration of electrolyte in the electrolyte-retaining matrix can be prevented by changing the electrolyte saturated absorption amounts of the anode and the cathode, and making the electrolyte saturated absorption amount of the cathode smaller than that of the anode, and a decrease in the cell performance can be remarkably suppressed.

What is claimed is:

1. A fuel cell using phosphoric acid as an electrolyte, which comprises a pair of counterposed gas-diffusible electrodes each having a catalyst-supporting, electroconductive, porous particle layer containing a water-repellent binder by firing; a phosphoric acid-retaining, porous matrix provided between and in contact with the electrodes; a fuel chamber for feeding a hydrogen-containing gas to the anode of the pair of the electrodes and an oxidizing agent chamber for feeding an oxygen-containing gas to the cathode of the pair of the electrodes; the anode being made to have a larger phosphoric acid saturated absorption amount than that of the cathode by making the percentage by weight of the water-repellent binder in the catalyst-supporting layer of the cathode smaller than that of the water-repellent binder in the catalyst-supporting layer of the anode, and by changing the firing temperature of the anode to be lower than that of the cathode.

2. A fuel cell according to claim 1, wherein the phosphoric acid saturated absorption amount of the cathode is in a range of 3 to 6 mg/cm$^2$.

3. A fuel cell according to claim 1, wherein the amount of the water-repellent binder in the anode is 0.81 to 1.2 times that in the cathode.

4. A fuel cell according to claim 3, wherein the water-repellent binder is polytetrafluoroethylene.

5. A fuel cell according to claim 1, wherein the electroconductive, porous substrate is carbon paper.

6. A fuel cell according to claim 1, wherein the electroconductive, porous particles are carbon particles.

7. A fuel cell according to claim 1, wherein the catalyst is a noble metal selected from group VIII of the Periodic Table.

8. A fuel cell according to claim 1, wherein the phosphoric acid-retaining matrix comprises silicon carbide particles and a metal phosphate, the silicon carbide particles having an average particle size of 0.1 to 100 μm.

9. A fuel cell according to claim 8, wherein the metal phosphate is zirconium phosphate.

10. A fuel cell according to claim 8, wherein a ratio of the silicon carbide particles to the metal phosphate by weight is 20–80:80–20.

11. A fuel cell according to claim 1, wherein the anode is made to have larger phosphoric acid saturated absorption amount than that of the cathode by making the firing time of the cathode longer than that of the anode.

12. A fuel cell according to claim 11, wherein the water-repellent binder is polytetrafluoroethylene.

13. A fuel cell according to claim 12, wherein the firing temperature of the cathode is above 340° C. and below the thermal decomposition temperature of the water-repellent binder.

14. A fuel cell according to claim 12, wherein the firing temperature of the anode is in a range of 300° to 340° C.

15. A fuel cell according to claim 11, wherein the phosphoric acid saturated absorption amount of the anode is 3 to 20 times as large as that of the cathode.

16. A fuel cell according to claim 15, wherein the phosphoric acid saturated absorption amount of the cathode is in a range of 1 to 6 mg/cm$^2$ and that of the anode is not more than 20 mg/cm$^2$.

17. A fuel cell according to claim 1, wherein the phosphoric acid saturated absoprtion amount of the anode is 3 to 20 times as large as that of the cathode.

18. A fuel cell according to claim 17, wherein the phosphoric acid saturated absorption amount of the cathode is in a range of 1 to 6 mg/cm$^2$ and that of the anode is not more than 20 mg/cm$^2$.

19. A fuel cell according to claim 1, wherein said electroconductive, porous particle layer also contains water-repellent particles other than said binder.

20. A fuel cell according to claim 19, wherein the water-repellent particles are graphite fluoride particles.

* * * * *